US011046156B2

(12) United States Patent
Peidro Aparici

(10) Patent No.: US 11,046,156 B2
(45) Date of Patent: Jun. 29, 2021

(54) REINFORCED VEHICLE DOOR AGAINST SIDE IMPACT

(71) Applicant: AUTOTECH ENGINEERING, S.L., Amorebieta-etxano (ES)

(72) Inventor: Julio Peidro Aparici, Barcelona (ES)

(73) Assignee: AUTOTECH ENGINEERING, S.L., Amorebieta-etxano (ES)

( * ) Notice: Subject to any disclaimer, the term of this patent is extended or adjusted under 35 U.S.C. 154(b) by 0 days.

(21) Appl. No.: 15/529,666

(22) PCT Filed: Nov. 26, 2015

(86) PCT No.: PCT/EP2015/077782
§ 371 (c)(1),
(2) Date: May 25, 2017

(87) PCT Pub. No.: WO2016/083510
PCT Pub. Date: Jun. 2, 2016

(65) Prior Publication Data
US 2017/0326954 A1 Nov. 16, 2017

(30) Foreign Application Priority Data
Nov. 27, 2014 (EP) ..................................... 14382481

(51) Int. Cl.
*B60J 5/04* (2006.01)
(52) U.S. Cl.
CPC ........... *B60J 5/0427* (2013.01); *B60J 5/0412* (2013.01); *B60J 5/0444* (2013.01); *B60J 5/0451* (2013.01); *B60J 5/0456* (2013.01)
(58) Field of Classification Search
CPC ........ B60J 5/042; B60J 5/0422; B60J 5/0423; B60J 5/0427; B60J 5/0443; B60J 5/0444; B60J 5/0451; B60J 5/0452; B60J 5/0455
(Continued)

(56) References Cited

U.S. PATENT DOCUMENTS 4,017,117 A * 4/1977 Eggert, Jr. ............. B60J 5/0473
296/146.6
4,272,103 A * 6/1981 Schmid .................. B60R 19/42
280/751

(Continued)

FOREIGN PATENT DOCUMENTS

DE 19755935 A1 * 6/1998 ............ B60J 5/0427
DE 10 2008 034 038 A1 3/2009

(Continued)

OTHER PUBLICATIONS

DE 102017005759A1 google search result (Year: 2017).*

(Continued)

*Primary Examiner* — Hilary L Gutman
(74) *Attorney, Agent, or Firm* — Finnegan, Henderson, Farabow, Garrett & Dunner LLP

(57) ABSTRACT

A vehicle door for use in a vehicle body comprising a rocker (20) is described. The vehicle door comprises an inner door panel (11) and an outer door panel (13), wherein the door further comprises a reinforcement element (12) arranged in a lower portion of the door such that when the door is mounted in the vehicle body, the reinforcement element (12) is at the height of the rocker (20) and such that when a side impact is received by the door the reinforcement element with the inner door panel is supported by the vehicle rocker. The reinforcement element (12) is a U-shaped bracket that extends from the inner door panel (11) to the outer door panel (13), the U-shaped bracket (12) being arranged with an open side facing the inner panel. The disclosure further relates to a vehicle having a vehicle body that comprises a rocker and such a door.

13 Claims, 10 Drawing Sheets

(58) Field of Classification Search
USPC .............. 296/146.6, 193.05, 187.03, 187.12
See application file for complete search history.

(56) References Cited

U.S. PATENT DOCUMENTS

| | | | | |
|---|---|---|---|---|
| 4,307,911 A * | 12/1981 | Pavlik | ................... | B60J 5/045 |
| | | | | 296/146.6 |
| 5,124,186 A * | 6/1992 | Wycech | ................ | B60J 5/0444 |
| | | | | 264/46.6 |
| 5,553,910 A * | 9/1996 | Park | ..................... | B60J 5/0447 |
| | | | | 296/187.12 |
| 6,096,403 A * | 8/2000 | Wycech | ............. | B29C 44/1228 |
| | | | | 428/122 |
| 7,837,255 B1 * | 11/2010 | Okutsu | ................. | B60J 5/0425 |
| | | | | 296/187.12 |
| 7,967,368 B2 * | 6/2011 | Duguet | ................. | B60J 5/0443 |
| | | | | 296/146.6 |
| 8,661,617 B1 * | 3/2014 | Kim | ...................... | B60J 5/0451 |
| | | | | 16/82 |
| 8,702,153 B2 * | 4/2014 | Kurokawa | ............ | B60J 5/0443 |
| | | | | 296/146.6 |
| 9,150,084 B2 * | 10/2015 | Makowski | ............ | B60J 5/0456 |
| 9,254,732 B2 * | 2/2016 | Dettling | ................ | B60J 5/0427 |
| 9,283,702 B2 * | 3/2016 | Reese | ................. | B29C 45/1418 |
| 9,944,153 B2 * | 4/2018 | List Clausen | ......... | B60J 5/0402 |
| 9,944,325 B2 * | 4/2018 | Murray | ................ | B62D 21/157 |
| 10,099,725 B2 * | 10/2018 | Ishii | ..................... | B62D 21/157 |
| 10,214,082 B2 * | 2/2019 | Nagaishi | ............. | B60J 5/0427 |
| 2007/0228769 A1 * | 10/2007 | Dandekar | ............. | B60J 5/0451 |
| | | | | 296/146.6 |
| 2008/0093889 A1 * | 4/2008 | Yao | ....................... | B60J 5/0427 |
| | | | | 296/187.12 |
| 2010/0060031 A1 * | 3/2010 | Duguet | ................. | B60J 5/0427 |
| | | | | 296/187.12 |
| 2012/0086238 A1 * | 4/2012 | Tan | ...................... | B62D 25/025 |
| | | | | 296/209 |
| 2012/0146359 A1 * | 6/2012 | Wille | .................... | B60J 5/0444 |
| | | | | 296/146.6 |
| 2013/0057018 A1 * | 3/2013 | Reese | ................. | B29C 45/1418 |
| | | | | 296/146.6 |
| 2014/0319869 A1 * | 10/2014 | Baskar | .................. | B60J 5/0423 |
| | | | | 296/146.6 |
| 2015/0151616 A1 * | 6/2015 | Makowski | ............ | B60J 5/0456 |
| | | | | 296/146.6 |
| 2015/0258878 A1 * | 9/2015 | Sugiyama | .............. | B60J 5/0429 |
| | | | | 49/505 |
| 2016/0031298 A1 * | 2/2016 | Yoshihara | .............. | B60J 5/0402 |
| | | | | 296/146.2 |
| 2016/0107512 A1 * | 4/2016 | List Clausen | ......... | B60J 5/0402 |
| | | | | 49/503 |
| 2017/0246936 A1 * | 8/2017 | Takagai | ................. | B60J 5/0429 |
| 2017/0313166 A1 * | 11/2017 | Sugie | .................... | B60J 5/0429 |
| 2018/0111453 A1 * | 4/2018 | Patel | ..................... | B60J 5/0455 |

FOREIGN PATENT DOCUMENTS

| | | | | |
|---|---|---|---|---|
| DE | 10 2013 009 923 A1 | | 3/2014 | |
| DE | 10 2013 021 239 A1 | | 7/2014 | |
| DE | 102015208317 A1 * | | 11/2016 | ............ B60J 5/0451 |
| EP | 0 426 648 A2 | | 5/1991 | |
| EP | 0727330 A2 * | | 8/1996 | .............. B60J 5/045 |
| EP | 2085260 A2 * | | 8/2009 | ............ B60J 5/0452 |
| FR | 2232461 A1 * | | 1/1975 | ............ B60J 5/0425 |
| FR | 2 567 460 A1 | | 1/1986 | |
| FR | 2567460 A1 * | | 1/1986 | ............ B60J 5/0451 |
| FR | 2 903 957 A1 | | 1/2008 | |
| FR | 3050705 A1 * | | 11/2017 | |
| JP | H08 132879 A | | 5/1996 | |
| JP | 09290705 A * | | 11/1997 | |
| JP | H10 095231 | | 4/1998 | |
| JP | H10-95231 A | | 4/1998 | |
| JP | 2004009975 A * | | 1/2004 | ............ B60J 5/0477 |
| JP | 2007030635 A * | | 2/2007 | |
| WO | WO-2004067305 A1 * | | 8/2004 | ............ B60J 5/0452 |
| WO | WO-2005097528 A1 * | | 10/2005 | ............ B60J 5/0452 |
| WO | WO-2019110732 A1 * | | 6/2019 | ............ B60J 5/0455 |

OTHER PUBLICATIONS

Machine translation of DE 102013009923 from Espacenet website (Year: 2014).*
Machine translation of WO 2005097528 (Year: 2005).*
Machine translation of DE 102015208317 (Year: 2015).*
Machine translation of JP 2004009975 (Year: 2004).*
Machine translation of EP 2085260 (Year: 2009).*
International Search Report and Written Opinion of the International Searching Authority for corresponding International Patent Application No. PCT/EP2015/077782 dated Feb. 10, 2016, 11 pgs.
Extended European Search Report for corresponding European Patent Application No. 14382481.1 dated May 12, 2015, 8 pages.

* cited by examiner

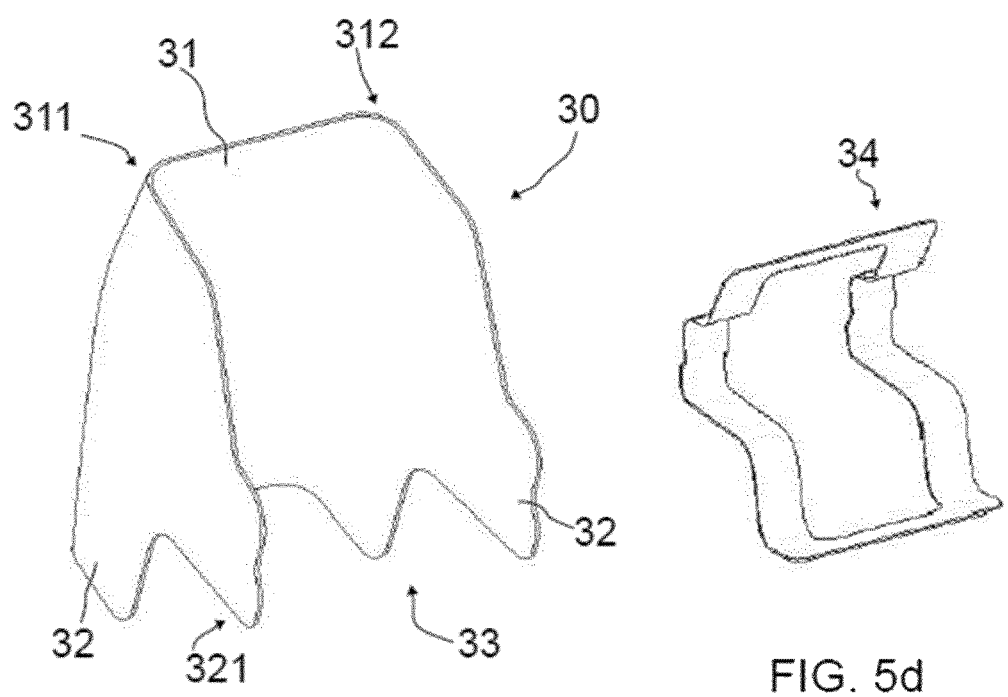
FIG. 5c
FIG. 5d
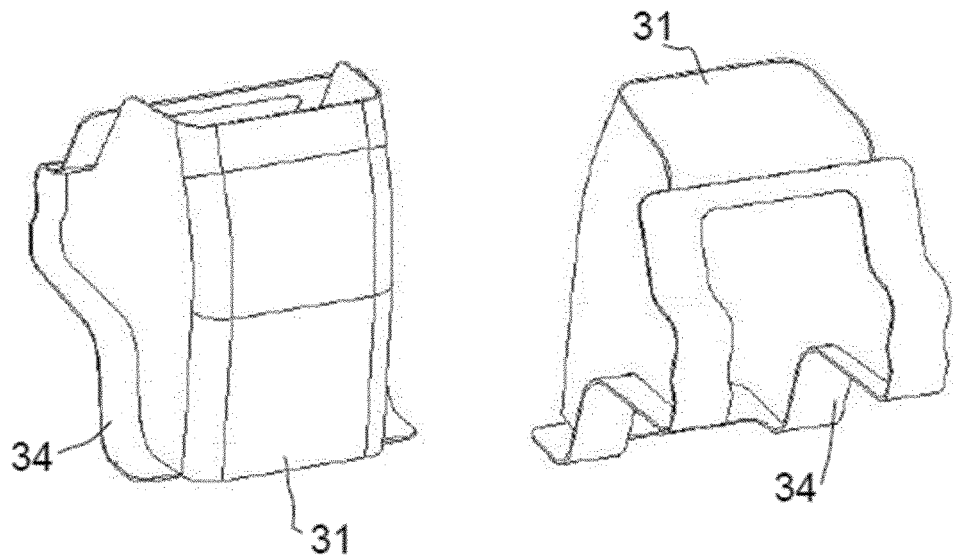
FIG. 5e
FIG. 5f

REINFORCED VEHICLE DOOR AGAINST SIDE IMPACT

This application is a National Stage of PCT/EP2015/077782, filed on Nov. 26, 2015, which claims the benefit of European Patent Application EP14382481.1 filed on Nov. 27, 2014, and which applications are incorporated herein by reference. To the extent appropriate, a claim of priority is made to each of the above disclosed applications.

The present disclosure relates to reinforced vehicle doors and further to vehicles such as cars or trucks comprising such doors.

BACKGROUND

Vehicles such as e.g. cars incorporate a structural skeleton designed to withstand all loads that the vehicle may be subjected to during its lifetime. The structural skeleton is further designed to withstand and absorb impacts, in case of e.g. collisions with, e.g. other cars.

The structural skeleton of a car in this sense may include e.g. a bumper, pillars (A-pillar, B-Pillar, C-Pillar), side impact beams, a rocker, and shock absorbers. These components may incorporate e.g. a beam and additional plates around such a beam.

In particular, many vehicle doors comprise a side impact beam in order to reduce the intrusion of the door into the vehicle. Side impact beams are passive safety devices, installed in most car doors and other ground vehicles and which protect passengers from side impacts. The term "passive safety" is used herein to refer to components of the vehicle (primarily airbags, seatbelts and the physical structure of the vehicle) that help to protect occupants during a crash.

For the design of a vehicle door, side impacts are particularly relevant for two reasons: a) the location of the impact is very close to the passengers, who can be immediately reached by the impacting vehicle or by a deformed component of the vehicle; b) in many side-impact accidents, the impacting vehicle may be larger, taller, heavier, or structurally stiffer than the struck vehicle. The structural skeleton of a door is thus necessary to absorb the kinetic energy of the colliding vehicles that is partially converted into internal work of the members involved in the crash. Above-mentioned side impact beams are normally used for this purpose.

In order to increase the strength of the door against lateral impacts, it is known to increase the thickness of the materials forming e.g. the side impact beam and/or the inner door panel or even adding a further side impact beam. However, this can lead to significant weight increases and thus to cost increments.

A vehicle door may typically comprise an inner door panel (on the passenger's side), an outer door panel, and a side impact beam, in between the inner door panel and the outer door panel. However, there is typically not a lot of space available between the inner and outer door panels. In that sense, side impact beams cannot be placed at arbitrary heights. Furthermore, side impact beams usually extend from a front end of the door to a rear end of the door in the vehicle longitudinal direction, thus having a considerably length. This may lead to high bending loads, especially in the central portion of the side impact beam. In order to avoid these bending loads, it is known to provide a support member (either foam or a steel bracket) between the side impact beam and the inner door panel. Document JPH1095231 describes such systems. Further improvements are desirable.

The present disclosure provides alternative reinforced ground vehicle doors which are able to increase safety of the passengers in case of side impacts at a relatively low weight penalty.

SUMMARY

In a first aspect, a vehicle door for use in a vehicle body comprising a rocker is provided. The vehicle door comprises an inner door panel, an outer door panel and a reinforcement element arranged in a lower portion of the door such that when the door is mounted in the vehicle body, the reinforcement element is at the height of the rocker and such that when a side impact is received by the door the reinforcement element with the inner door panel is supported by the vehicle rocker.

According to this aspect, the provision of a reinforcement element inside the door (between the inner and outer door panels) located so as to be supported by the vehicle rocker in case of a side impact enhances safety of the occupants of the vehicle. The vehicle rocker may be regarded as a very rigid structural beam. A structural element of the vehicle body (the rocker) is thus used for supporting the reinforcement element. The reinforcement element is thus able to deform and absorb at least part of the kinetic energy involved in the collision thus avoiding or at least substantially reducing the risk of intrusion of the door into the vehicle body (passengers' compartment). Furthermore, since the vehicle rocker extends longitudinally along the length of the vehicle body, transferring the collision kinetic energy to the rocker further involves distributing of the collision loads to the whole vehicle body.

In some examples, the reinforcement element may extend from the inner door panel to the outer door panel. An aspect of providing the reinforcement extending completely from the inner door panel to the outer door panel is that a ratio material used/impact absorption is improved.

The inventor has found that with a relatively small increase in the weight of the door (considering only steel parts), the energy absorption of the door can be significantly increased in the so-called "Side Pole Test" and so-called "FMVSS214S Test". The intrusion of the door into the occupants' compartment may be reduced at the same time.

A further outcome of the hereinbefore described door is that the reinforcement element is provided in a portion of the door that is usually empty thus taking advantage of a space of the door that is normally not used at all. Furthermore and from a manufacturing viewpoint, it is relatively simple to assemble the two door panels with the reinforcement element at its lower portion as it does not involve special calculations to determine e.g. the height at which the reinforcement is to be placed.

Throughout the present description and claims a vehicle is to be understood as a car, a truck or any other ground vehicle having a vehicle body comprising a rocker.

In some examples, the reinforcement element may have a lower end and the inner door panel may comprise a substantially vertical lower portion, and the reinforcement element may be fixed to the substantially vertical lower portion at its lower end. In alternative examples, the outer door panel may comprise a substantially vertical lower portion and the reinforcement element may be fixed to this substantially vertical lower portion. In yet further examples, both, the inner and outer door panels may comprise a substantially vertical lower portion and the reinforcement element may be fixed to both vertical portions. This enhances a safe fixation of the reinforcement element as it is easier to weld, glue or screw a reinforcement element to a straight surface rather than to a curved one. Furthermore it leads to a more resistant joint as it does not need to work in shear and as a consequence, wear of the joint is at least partially reduced.

In some examples, the reinforcement element may be a reinforcement bracket. In some of these cases, it may be a folded metal sheet, for example, a steel sheet. In further examples, U-shaped brackets may be foreseen.

In some of these examples, the U-shaped bracket may extend from the inner door panel to the outer door panel and may be arranged with an open side facing the inner door panel. By extending the bracket completely from the inner door panel to the outer door panel, a ratio material used/impact absorption is improved.

Furthermore, if the open side of the U-shaped bracket faces the inner door panel, this means that the base wall of the bracket faces the outer door panel. The base wall of the bracket thus extends along a direction substantially parallel to the outer door panel and receives the impact as such. The side walls (that are arranged in the same direction than that of an impact) absorb the kinetic energy involved in the impact. This can enhance impact distribution, along a surface of the base wall and kinetic energy absorption, along the length of the side walls, i.e. in a vehicle's transversal direction.

Throughout the present disclosure, a U-shaped bracket should be understood as a bracket with a cross-section substantially in the shape of a letter U. This may preferably mean a bracket comprising a base wall that extends in a longitudinal direction of the vehicle length from a front end to a rear end, and a pair of laterally opposed side walls that extend respectively away from the base wall front and rear ends. The laterally opposed side walls define an aperture (open side) that is opposite to the base wall.

According to this, the provision of a U-shaped bracket inside the door's lower portion, the bracket extending from the inner to the outer door panels and located so as to be supported by the vehicle rocker in case of a side impact enhances safety of the occupants of the vehicle.

In some examples, the U-shaped bracket may comprise ends of the laterally opposed side walls configured to be supported by the inner door panel. In these cases, a mounting flange may be provided. This enlarges a supporting area facing the inner door panel thus enhancing stress distribution on the inner door panel.

In some of these examples, the reinforcement element may comprise one or more portions in a horizontal plane with respect to the inner and/or outer door panel. These horizontal plane portions are transversal with respect to the vehicle longitudinal direction, i.e. they are transversal with respect to e.g. the rocker, thus acting directly against a lateral impact. The substantially horizontal portions may thus absorb energy deforming under buckling.

In another aspect, a vehicle having a door substantially as hereinbefore described is provided. In particular, a vehicle that comprises a vehicle body having a rocker, wherein the door may be mounted in the vehicle body such that the reinforcement element is at the height of the rocker.

In some examples, the vehicle rocker may comprise an inner shell and an outer shell defining a space between them. The inner rocker shell and the outer rocker shell may be joined at least at a top flange. In some of these cases, the reinforcement element may be arranged at least partially below the top flange so that it is at the height of the rocker and it can thus be supported (together with a lower portion of the inner door panel) by the rocker in case of a side impact. In alternative examples, the vehicle rocker may be a single piece having at least a top flange. Also in these cases, the reinforcement element may be arranged at least partially below the top flange.

In those examples in which the reinforcement element may comprise one or more portions in a horizontal plane with respect to the inner and/or outer door panel, a first horizontal plane portion may be provided right below the top flange that joins the rocker inner and outer shells.

BRIEF DESCRIPTION OF THE DRAWINGS

Non-limiting examples of the present disclosure will be described in the following, with reference to the appended drawings, in which:

FIGS. 5c-5f show perspectives of examples of the U-shaped brackets or bracket's parts similar to those of FIG. 4 or 5b;

DETAILED DESCRIPTION OF EXAMPLES

It should be noted that the vehicle doors that are described herein may correspond to front or rear doors of any ground vehicle.

Throughout the following figures the same reference numbers will be used for matching parts.

Figure 1A:
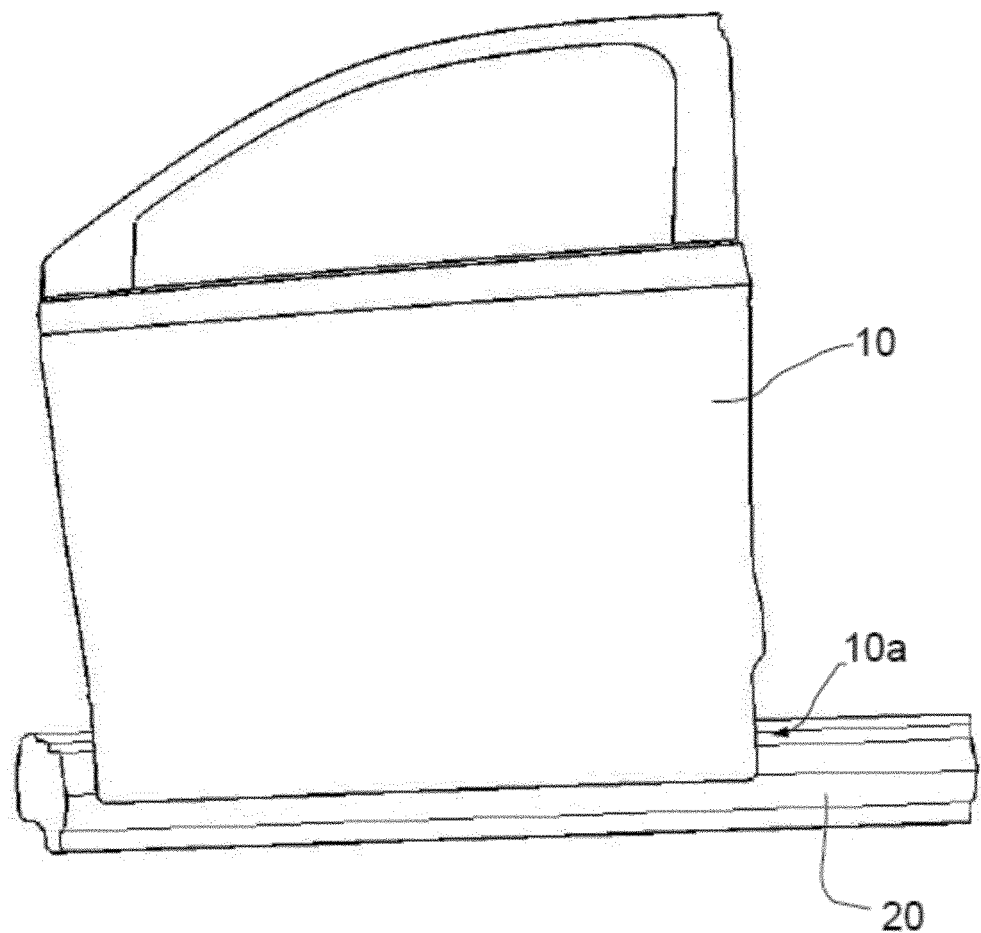
FIGS. 1a and 1b show a partial side view of a vehicle according to an example.
Figure 1B:
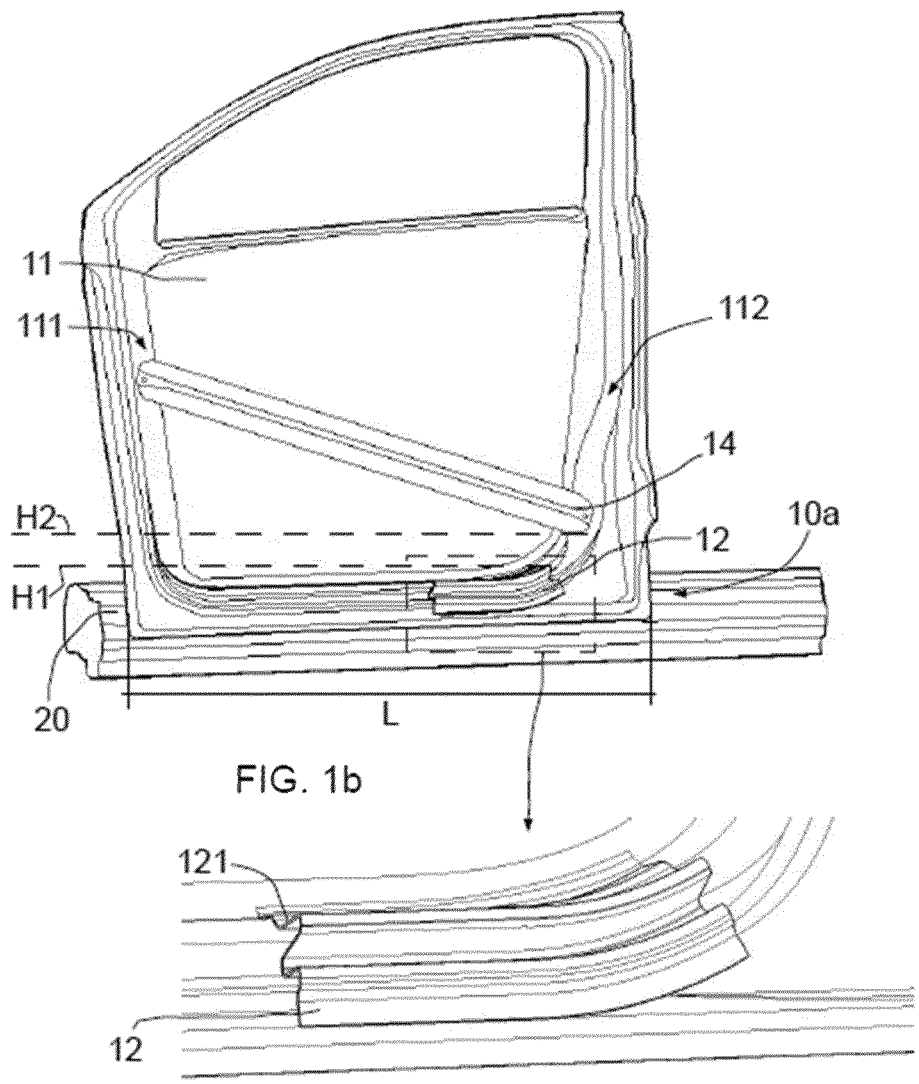

FIGS. 1a and 1b show a partial side view of a ground vehicle according to an example. FIG. 1a shows a vehicle door 10 and a portion of a vehicle rocker 20. FIG. 1b shows an inner door panel 11 of the vehicle door 10 of FIG. 1a. The door 10 may be mounted to a vehicle body (not shown) comprising a rocker 20. As further shown in FIGS. 1a and 1b, when the door 10 is mounted to the vehicle body, a lower portion 10a of the door may have a shape that is complementary to the shape of the rocker 20.

The door 10 may comprise an outer panel (see FIGS. 2, 3 and 4) and an inner panel 11. FIG. 1b further shows that a reinforcement element 12 may be arranged on the inner door panel 11, in a lower portion 10a of the door which may be at the height of the rocker 20. FIG. 1b further shows that the reinforcement element 12 may extend along approximately a rear third portion of the inner door panel 11. In view of the so-called "side Pole Test" the arrangement of the reinforcement element in a rear portion of the door, i.e. close to the B-pillar in case of a front door can be advantageous.

Inventors have found that a reinforcement element having a length corresponding up to substantially a rear third portion the length of the inner door panel provides a good balance between energy absorption and weight increase. Depending on circumstances the reinforcement element may have a length from approximately 33% to approximately 5% of the rear portion of the door length.

In alternative examples, the reinforcement element may be provided along a different length or even the whole length L of the inner door panel. In further examples more than one reinforcement elements may be provided (see FIG. 6). In still further examples, the reinforcement element may be arranged to the outer door panel and it may be fixed to any of the inner or outer door panel or even to both, the inner and outer panel.

The enlarged detail of FIG. 1b shows that the reinforcement element 12 may be a bracket, for example a metal sheet bracket, in particular a steel bracket. In some cases, the bracket may be a folded metal sheet or plate. In these cases the bracket may be fixed to any of the inner and/or outer panel by welding. In some examples, welding may comprise spot welding. An aspect of using spot welding is that a lot of energy can be delivered to the spot in a very short time thus permitting welding to occur without excessive heating of the remainder of the outer and/or inner door panels. The bracket may comprise one or more horizontal plane portions 121 with respect to the inner or outer door panel. These horizontal portions are provided transversally with respect to the rocker thus acting directly against a lateral impact in the sense of cushioning the kinetic energy of the collision. In alternative examples, other types of welding may be foreseen, e.g. laser welding or remote laser welding which may be particularly suitable when e.g. there is not much space available for carrying out the welding process.

FIG. 1b further shows that a side impact beam 14 may further be fixed to the inner door panel 11, in particular at the forward 111 and rear 112 ends of the inner door panel 11. The side impact beam 14 may extend substantially obliquely from the forward end 111 to the rear end 112 of the inner door panel 11 having a lower height H2 higher than an upper height H1 of the reinforcement element 12 thus not contacting the reinforcement element in case of a side impact. In alternative examples, other side impact beams arrangements may be foreseen, they may even be provided substantially horizontally. As further shown in FIG. 1b the side impact beam may be fixed (e.g. by screws) to the inner door panel ends. In alternative examples, the side impact beam may be fixed to the outer door panel.

Figure 2:
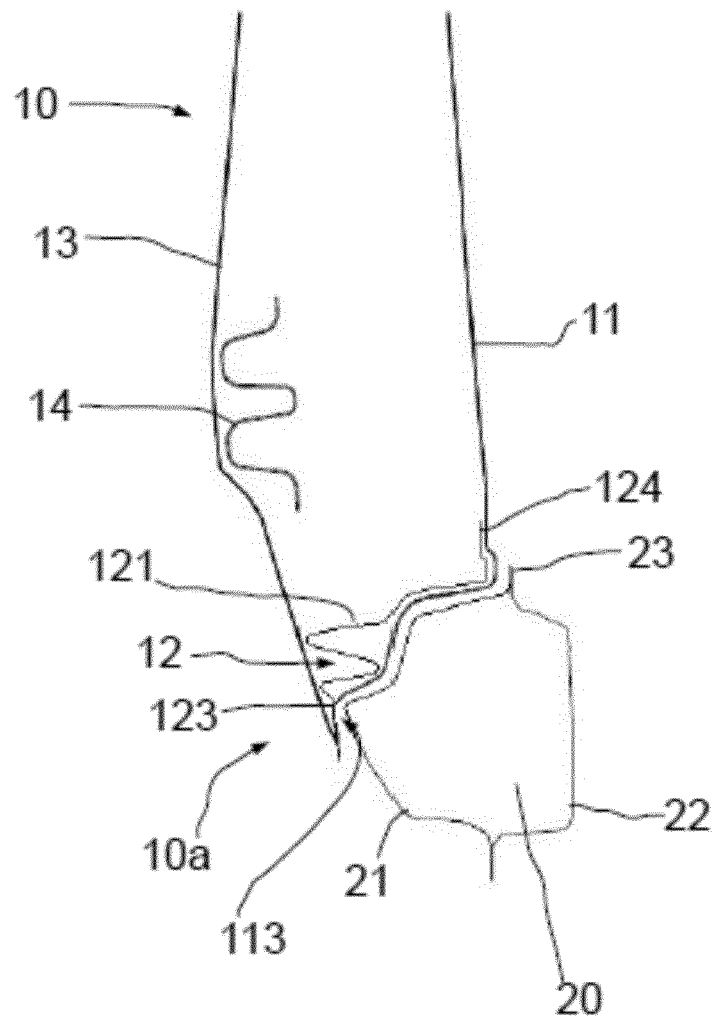
FIGS. 2, 3 and 4 show cross-sectional views of different examples of the reinforcement element of FIG. 1b.

FIG. 2 shows a cross-sectional view of the example of FIG. 1b. The vehicle door 10 may be mounted to a vehicle body comprising a rocker 20. The door 10 may comprise an inner door panel 11, an outer door panel 13 and a reinforcement element that may be e.g. a folded metal sheet bracket 12. The bracket 12 may extend completely between the inner 11 and outer 13 door panels. The bracket 12 may further be arranged in a lower portion 10a of the door such that when the door is mounted in the vehicle body, the bracket 12 is at the height of the rocker 20 and such that when a side impact is received by the door the bracket 12 with the lower portion of the inner door panel 11 are supported by the rocker 20.

The reinforcement bracket 12 may have a lower end 123 and the inner door panel may comprise a substantially vertical lower portion 113. The reinforcement bracket 12 may thus be fixed to the substantially vertical lower portion 113 at its lower end 123. This ensures fixation of the reinforcement element as it is easier to fix (by welding, by gluing or with screws) an element to a straight surface rather than to a curved one. In alternative examples, an upper end 124 may further be fixed to a substantially vertical portion of the inner door panel. In further alternatives, upper and/or lower ends of the bracket may be fixed to the outer door panel or they may be fixed to both, the inner and outer door panels at substantially vertical portions thereof.

In the example of FIG. 2 the bracket 12 may comprise one or more horizontal plane portions 121 that may be substantially horizontal with respect to the inner 11 and/or outer 13 door panels. In alternative examples, the bracket may be a corrugated metal sheet substantially completely filling the space of the lower portion of the door between the inner and outer door panel. In some examples, the bracket may be made of steel.

FIG. 2 further shows that the rocker 20 may comprise an inner shell 22 and an outer shell 21 defining a space between them. The inner rocker shell 22 and the outer rocker shell 21 may be joined at least at a top flange 23. In some cases, a bottom flange 24 may also be provided. According to this example, the bracket 12 may be fixed to the inner door panel 11 at its lower portion such that the horizontal plane portions 121 may be arranged below the top flange 23. This way, the bracket 12 with the lower portion of the inner door panel 11 can be supported by the rocker 20 in case of a side impact.

In the example of FIG. 2 the door 10 may further comprise a side impact beam 14 that may be arranged closer to the outer door panel 13 at a height higher than that of the reinforcement bracket 12 such that when a side impact is received by the door 10 the side impact beam 14 does not contact the reinforcement bracket 12. In alternative examples, the side impact beam may be arranged closer to the inner door panel and it may be fixed to the inner door panel. In still further examples a cushioning element may be provided between the side impact beam and any of the inner and/or outer door panels.

Figure 3:
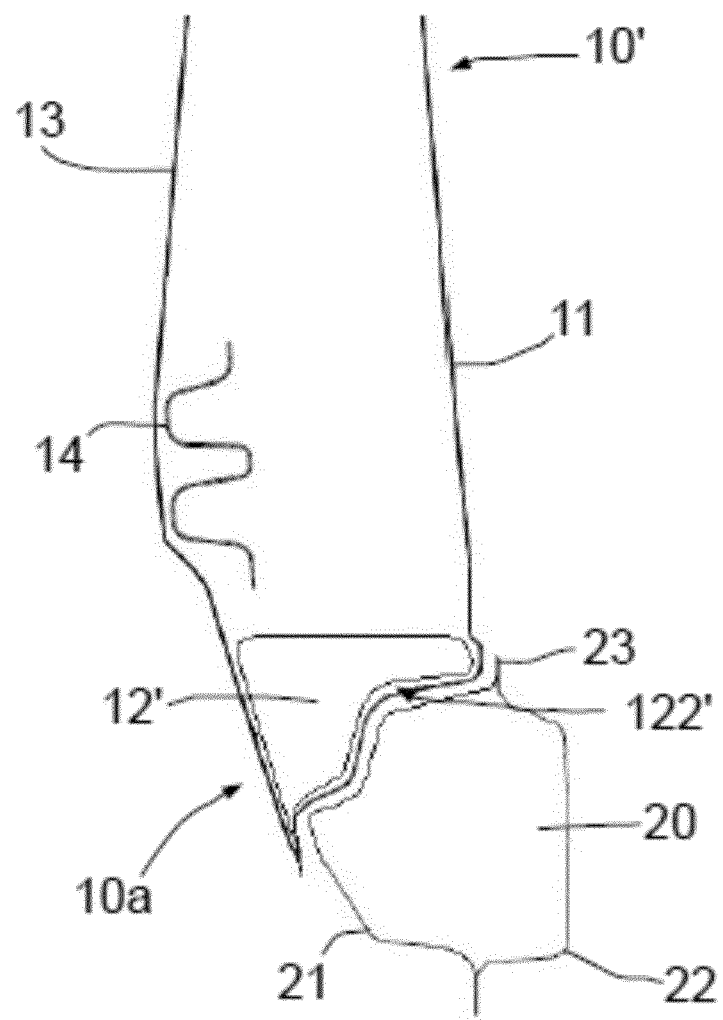

FIG. 3 shows a cross-sectional view of a vehicle door 10' mounted to a vehicle body comprising a rocker 20 according to another example. The example of FIG. 3 differs from that of FIG. 2 in that the reinforcement element may comprise a foam block 12'. In these examples, the foam block 12' may substantially completely fill the space of the lower portion 10a of the door between the inner 11 and outer 13 door panels. In these examples, most part of a side 122' of the foam block 12' facing the inner door panel 11 may be provided below the rocker top flange 23. This way, the foam block 12' with the lower portion of the inner door panel 11 can be supported by the rocker 20 in case of a side impact.

Figure 4:
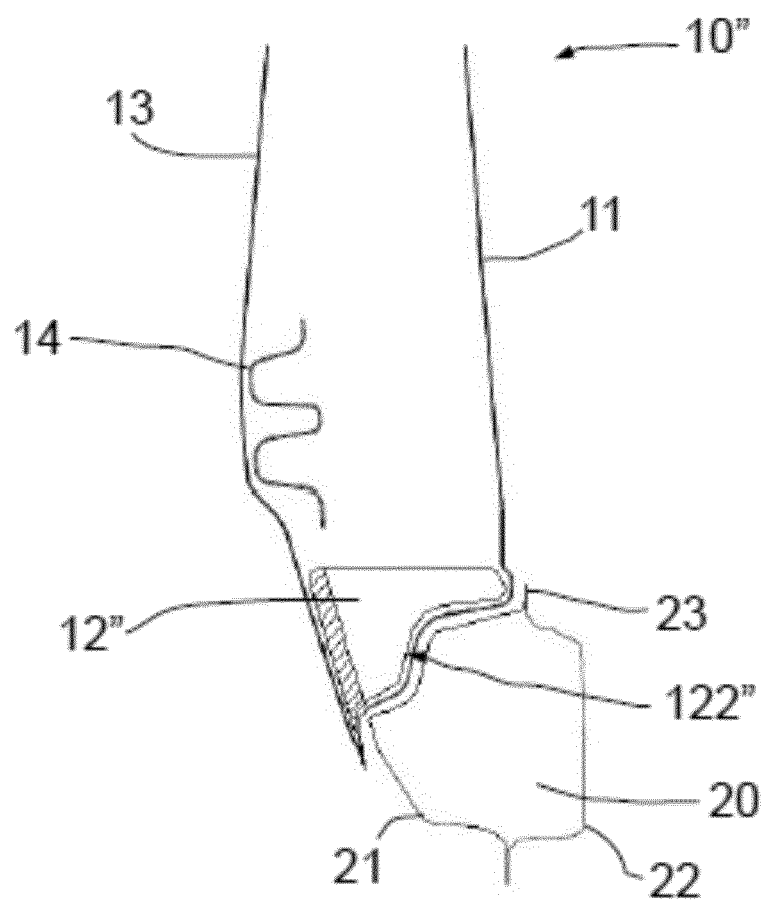

FIG. 4 shows a cross-sectional view of a vehicle door 10" mounted to a vehicle body comprising a rocker 20 according to a further example. The example of FIG. 4 differs from that of FIGS. 2 and 3 in that the reinforcement element may be a U-shaped bracket 12", i.e. a bracket having a U-shaped horizontal cross-section. An open side 122" of the U-shaped bracket 12" may be arranged facing the inner door panel 11. An outline of the open side 122" may have a shape complementary to the shape of the rocker outer shell 21. In this example, the U-shaped bracket 12" may be arranged substantially as described in connection with FIG. 1b, i.e. up to a rear third portion the length of the inner door panel.

Figure 5A:
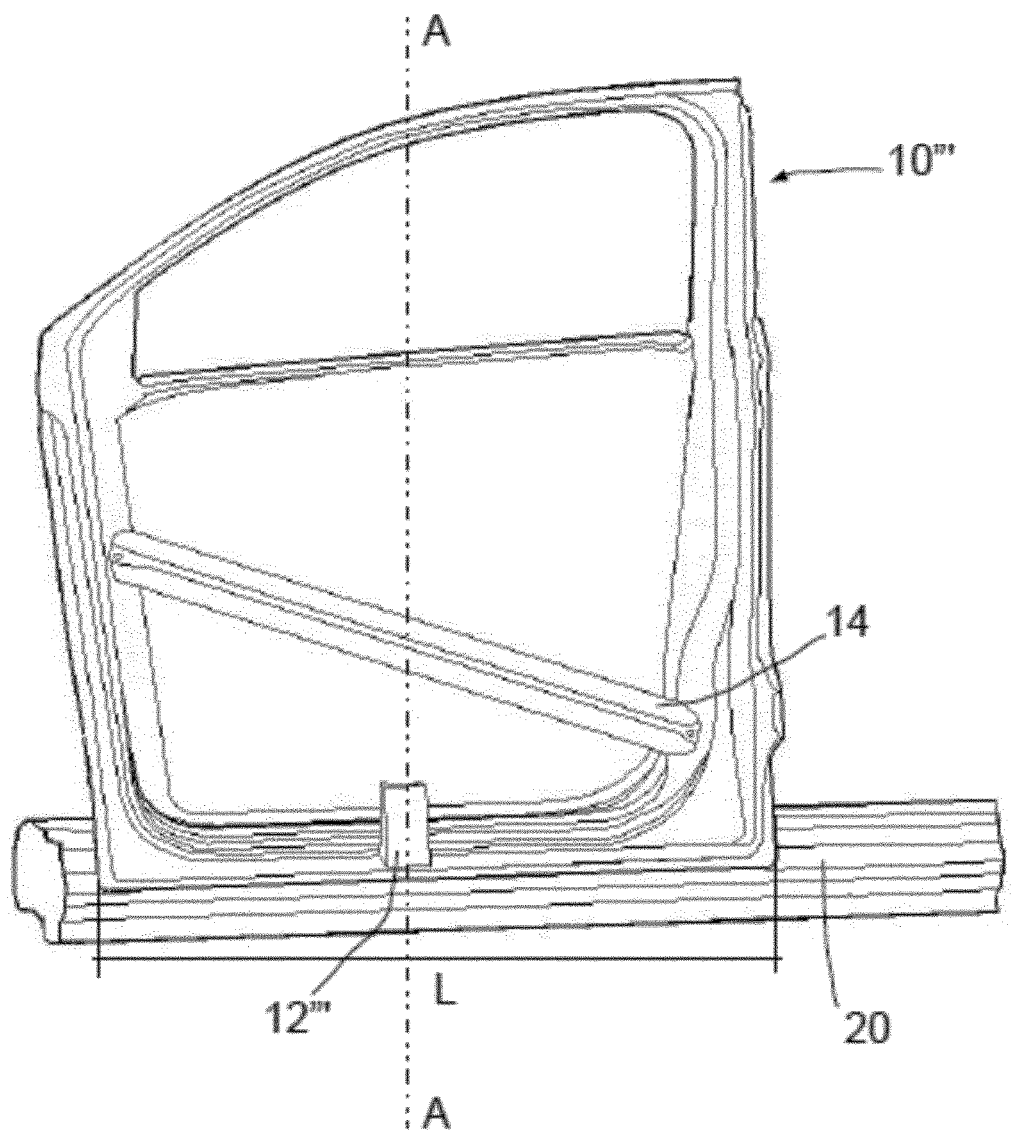
FIGS. 5a and 5b show respectively a partial side view and a cross-sectional view of a vehicle according to another example.
Figure 5B:
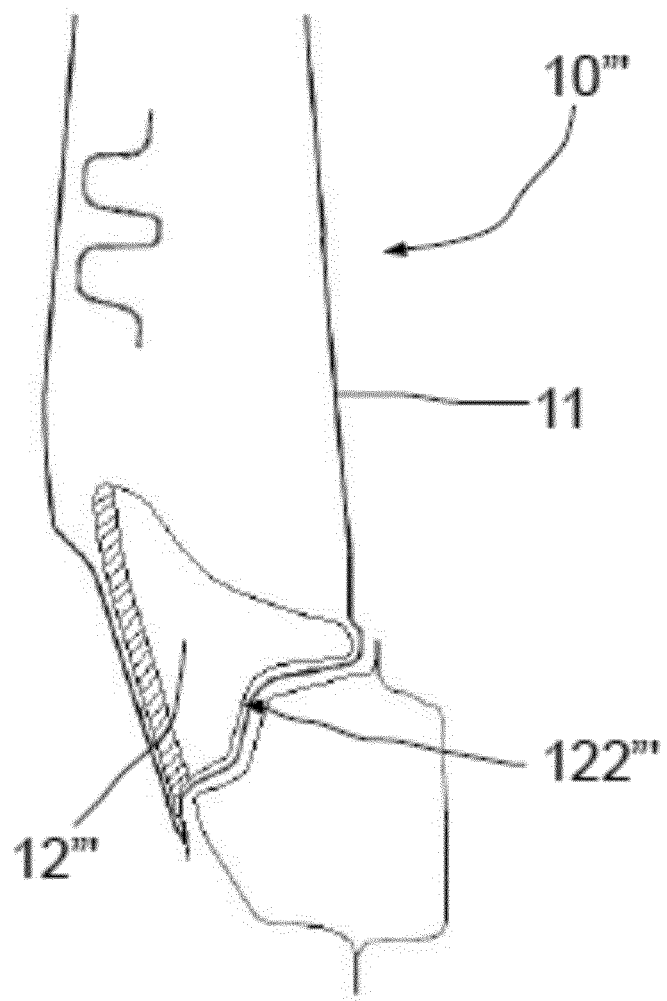

FIGS. 5a and 5b show respectively a partial side view of a ground vehicle according to another example and a cross-sectional view along line A-A of FIG. 5a. The example of FIGS. 5a and 5b differs from that of FIGS. 1b, 2 and 3 in the type of reinforcement element being used. And it is further differentiated from the example of FIG. 4 in the location of the reinforcement element along the door 10''' longitudinal length L. In this example, the reinforcement element may be a U-shaped bracket 12''' substantially as described in connection with FIG. 4 that may be arranged substantially in the middle of the doors' length L in view of the so-called "FMVSS214S Test". Particularly a steel bracket may be foreseen. The U-shaped bracket 12''' may be substantially similar in shape to that of the example of FIG. 4, i.e. having an open side 122''' arranged facing the inner door panel 11 and having an outline with a shape complementary to the shape of an outer rocker shell. The U-shaped bracket 12''' of this example however may have higher side walls than those of the example of FIG. 4 and may be slender (shorter in the vehicles longitudinal direction) than the bracket of the example of FIG. 4 to assure occupant's protection under the "FMVSS214S Test" which simulates a severe right-angle collision. Depending on circumstances, the U-shaped bracket 12''' of the present example may have a length approximately 5% to approximately 15% of the door length and as mentioned before it may be substantially centrally arranged.

The example of FIG. 5c shows a U-shaped bracket 30 that may comprise a base wall 31 and a pair of laterally opposed side walls 32. The base wall 31 may extend from a front end 311 to a rear end 312 and in use, may extend in a vehicle longitudinal direction. The side walls 32 may extend substantially perpendicularly from the base wall ends 311, 312. The side walls 32 may define an aperture/open side 33 opposite to the base wall 31.

FIG. 5d shows a mounting flange 34 that may be fixed to free ends (defining the aperture/open side) of the side walls 32 of the U-shaped bracket. See FIGS. 5e and 5f, wherein FIG. 5e is shown from the base wall 31 side and FIG. 5f is shown from the mounting flange 34 side. The free ends 321 of the side walls 32 may be opposite to the base wall 31.

As further shown in FIG. 5d, the mounting flange 34 may have a shape complementary to an outline of the free ends 321 of the side walls 32. As shown in FIGS. 5e and 5f, the mounting flange 34 may be fixed, e.g. by welding, to the free ends 321 of the side walls 32. Alternatively, the mounting flange may be made by folding outwardly, i.e. not towards the open side (aperture), the free ends 321 of the side walls 32.

In some examples, the U-shaped bracket may be made by e.g. cold stamping. The mounting flange may also be made by e.g. cold forming. Other known forming or stamping methods of manufacture the bracket or bracket parts may also be foreseen.

In all cases, the U-shaped bracket may be made from a metal plate with a thickness ranging from approximately 0.4 mm to approximately 1 mm.

In some examples, the base wall 31 may have a length in the door longitudinal direction (see e.g. reference L of FIG. 5a) that may range from approximately 50 mm to approximately 200 mm. The side walls 32 may have a height that may range from approximately 100 mm to approximately 200 mm and a length in a vehicle transversal direction that may range from approximately 50 mm to approximately 180 mm.

In an example, a U-shaped bracket as shown in FIG. 5e may be made from a metal plate that may have a thickness of approximately 0.6 mm. In this example, the base wall may have a length that extends in a longitudinal direction of the vehicle, from an upstream or front end to a downstream or rear end of approximately 100 mm and the side walls may have a maximum length (in a vehicle transversal direction) of approximately 105 mm and a height of approximately 120 mm.

Figure 5G:
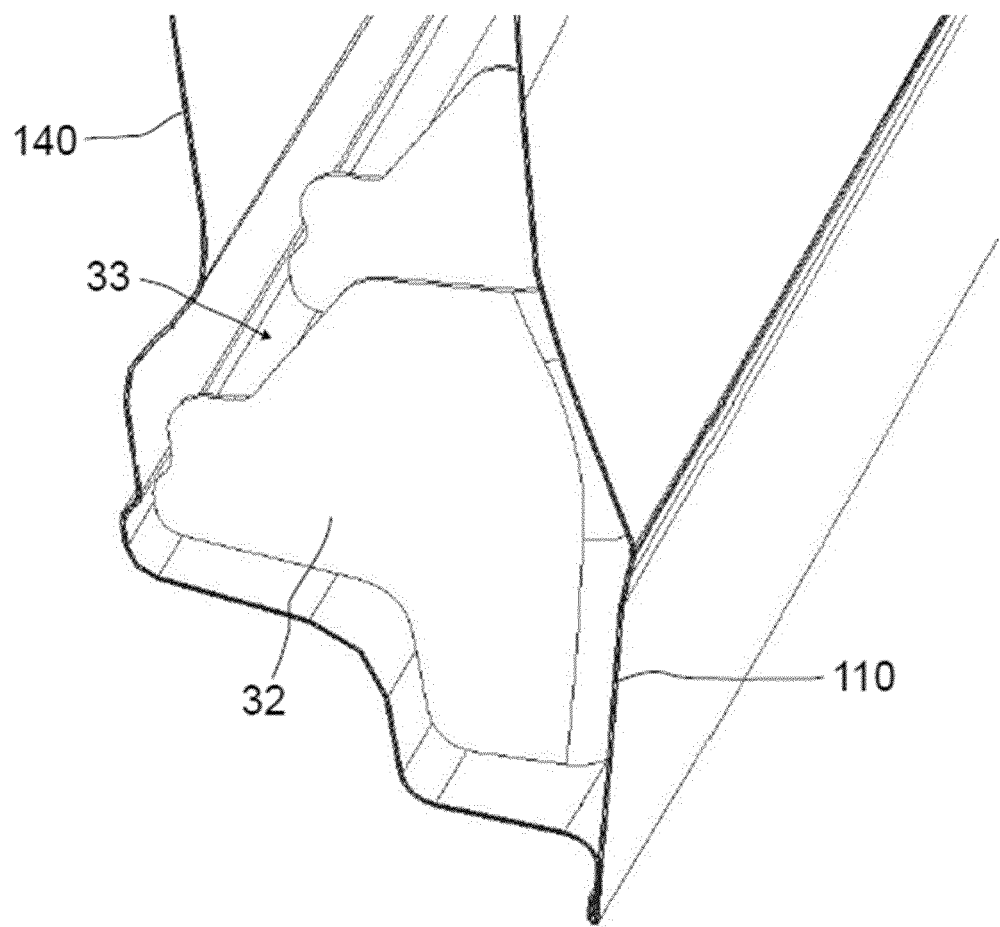
FIG. 5g shows a partial perspective and open view of a vehicle door lower portion comprising a U-shaped bracket as that of FIG. 5c.

The example of FIG. 5g shows a partial open perspective of a vehicle door lower portion with the U-shaped bracket 30 of the example of FIG. 5c. In this example, the U-shaped bracket may extend completely from the inner door panel 110 to the outer door panel 140. The base wall of the bracket may be supported by the outer door panel 140 and the free ends (or the mounting flange in those examples having mounting flange) of the side walls 32 may be supported on the inner door panel 110.

In some examples, any of these brackets may be substantially centrally arranged along a door length, in a similar manner as shown in connection with bracket 12''' in the example of FIG. 5a.

Figure 6:
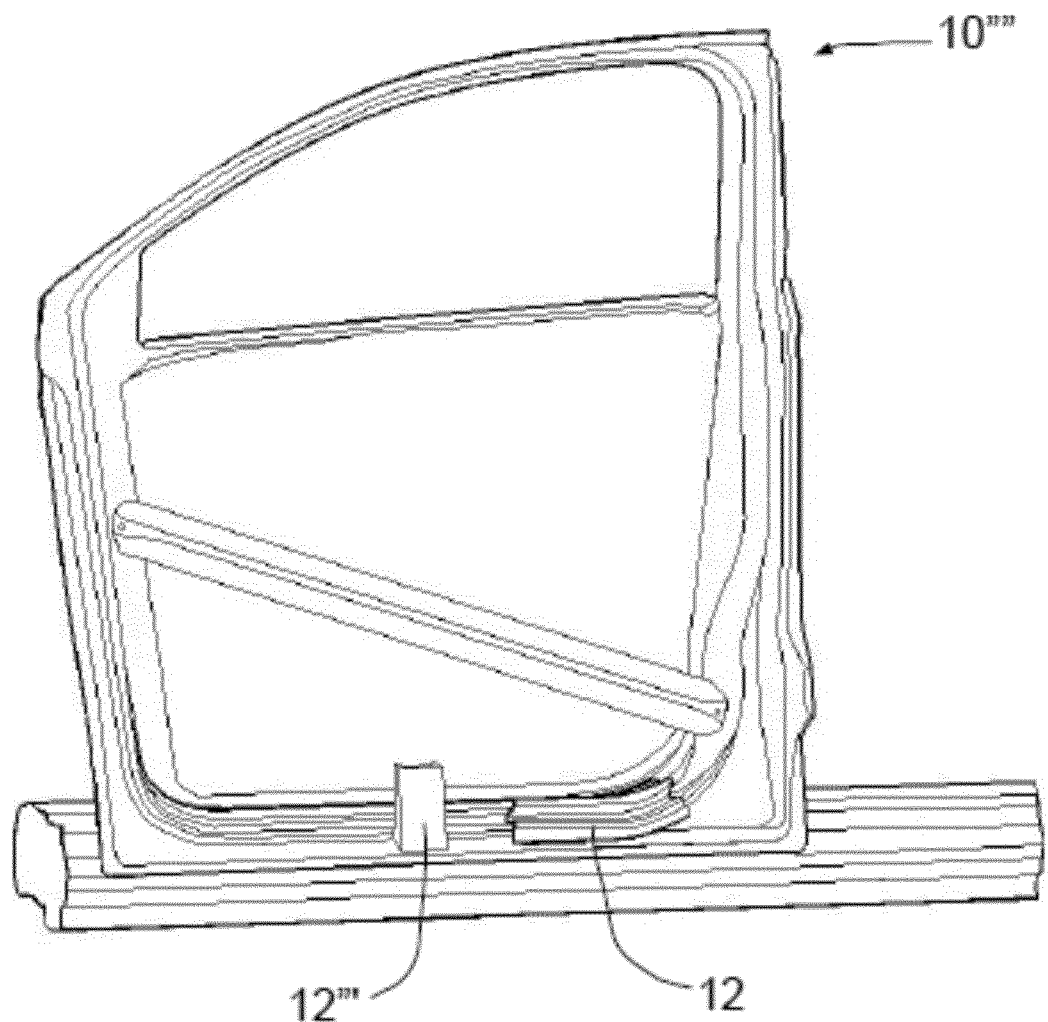
FIG. 6 shows a partial side view of a vehicle according to a still further example.

FIG. 6 shows a partial side view of a ground vehicle according to a still further example. In the example of FIG. 6 the door 10'''' may comprise an inner door panel provided with two reinforcement elements: a first reinforcement element that may be provided in a third rear portion as described in connection with FIG. 1b and that may be a folded metal bracket 12 as described in connection with FIGS. 1b and 2 or any of the alternative reinforcements 12' or 12'' described in connection with FIG. 3 or 4; and a second reinforcement that may be substantially centrally provided along the door length as described in connection with FIGS. 5a and 5b and that may be a U-shaped bracket 12''' as described in FIGS. 5a and 5b.

For reasons of completeness, various aspects of the present disclosure are set out in the following number of clauses:

Clause 1. A vehicle door for use in a vehicle body comprising a rocker, the vehicle door comprising an inner door panel and an outer door panel, wherein
the door further comprises a reinforcement element arranged in a lower portion of the door such that when the door is mounted in the vehicle body, the reinforcement element is at the height of the rocker and such that when a side impact is received by the door the reinforcement element with the inner door panel is supported by the vehicle rocker.

Clause 2. The vehicle door of clause 1, wherein the reinforcement element is fixed at least to the inner door panel.

Clause 3. The vehicle door of clause 1 or 2, wherein the reinforcement element extends from the inner door panel to the outer door panel.

Clause 4. The vehicle door of any of clauses 1-3, wherein the reinforcement element has a lower end and the inner door panel comprises a substantially vertical lower portion, and the reinforcement element is fixed to the substantially vertical lower portion at its lower end.

Clause 5. The vehicle door of any of clauses 1-4, wherein the reinforcement element comprises a foam block.

Clause 6. The vehicle door of any of clauses 1-4, wherein the reinforcement element is a reinforcement bracket.

Clause 7. The vehicle door of clause 6, wherein the reinforcement element is a folded metal sheet.

Clause 8. The vehicle door of clause 7, wherein the reinforcement element is a corrugated metal sheet comprising a plurality of folds, at least one of the folds extending substantially completely from the inner door panel to the outer door panel.

Clause 9. The vehicle door of any of clauses 6-8, wherein the reinforcement element comprises one or more portions in a substantially horizontal plane.

Clause 10. The vehicle door of clause 6, wherein the reinforcement element comprises a bracket having a U-shape horizontal cross-section arranged with an open side facing the inner door panel.

Clause 11. The vehicle door of any of clauses 1-10, wherein the reinforcement element is arranged in substantially one rear third portion of a longitudinal length of the inner and/or outer door panel.

Clause 12. The vehicle door of any of clauses 1-11, comprising two or more reinforcement elements fixed to the inner door panel and/or to the outer door panel, wherein a first reinforcement element is arranged in substantially one rear third portion of a longitudinal length of the inner and/or outer door panel and a second reinforcement element is arranged substantially centrally of the inner and/or outer door panel.

Clause 13. The vehicle door of any of clauses 1-12, further comprising a side impact beam extending substantially in a vehicle longitudinal direction, the side impact beam being arranged at a different height than that of the reinforcement element such that when a side impact is received by the door the side impact beam does not contact the reinforcement element.

Clause 14. A vehicle having a door according to any of clauses 1-13 and a vehicle body that comprises a rocker, wherein the door is mounted in the vehicle body such that the reinforcement element is at the height of the rocker.

Clause 15. The vehicle of clause 14, wherein the rocker comprises an inner shell and an outer shell defining a space between them, the inner and outer rocker shells being joined at least at a top flange, and the reinforcement element is arranged at least partially below the top flange.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A vehicle door for use in a vehicle body comprising a rocker, the vehicle door comprising an inner door panel and an outer door panel, wherein the door further comprises:
a reinforcement element arranged in a lower portion of the door such that when the door is mounted in the vehicle body, the reinforcement element is at the height of the rocker and such that when a side impact is received by the door the reinforcement element with the inner door panel is supported by the vehicle rocker, wherein the reinforcement element is a U-shaped bracket, with a base wall and a pair of laterally opposed side walls with free ends defining an open side opposite to the base wall, that extends from the inner door panel completely to the outer door panel and is arranged with the base wall supported by the outer door panel and the free ends of the pair of laterally opposed side walls supported by and facing the inner door panel, and wherein an outline along the open side of the U-shaped bracket has a shape complementary to a shape of an outer shell of the rocker;
a second reinforcement element fixed to at least one of the inner door panel or the outer door panel, wherein the second reinforcement element is arranged at the height of the rocker and has a length up to substantially a rear third portion of a longitudinal length of at least one of the inner door panel or the outer door panel; and
a side impact beam extending substantially in a vehicle longitudinal direction.

2. The vehicle door of claim 1, wherein the U-shaped bracket is fixed at least to the inner door panel.

3. The vehicle door of claim 1, wherein the U-shaped bracket is a cold-stamped U-shaped bracket with a base wall and a pair of opposed side walls.

4. The vehicle door of claim 1, wherein the U-shaped bracket comprises a base wall and a pair of laterally opposed side walls extending away from the base wall, the base wall being supported on the outer door panel and extending in a door length direction, and the pair of side walls extending substantially perpendicularly to the base wall and defining the open side of the bracket that faces the inner door panel.

5. The vehicle door of claim 4, wherein ends of the side walls opposite to the base wall comprise a mounting flange.

6. The vehicle door of claim 5, wherein the mounting flange is made by folding outwardly the ends of the side walls opposite to the base wall.

7. The vehicle door of claim 5, wherein the mounting flange is made by cold stamping and is fixed to the ends of the side walls opposite to the base wall.

8. The vehicle door of claim 1, wherein the U-shaped bracket has a lower vertical portion and the inner door panel comprises a substantially vertical lower portion, wherein the bracket is fixed to the substantially vertical lower portion at its lower vertical portion.

9. The vehicle door of claim 4, wherein the base wall has a length of approximately 5% to approximately 15% of a length of the door and the U-shaped bracket is arranged substantially in a middle of the length of the door.

10. The vehicle door of claim 9, wherein the base wall has a length in the door longitudinal direction ranging from 50 to 200 mm, and the side walls have a height ranging from 100 to 200 mm and a length in a vehicle transversal direction ranging from 50 to 180 mm.

11. The vehicle door of claim 1, wherein the side impact beam is arranged at a different height than that of the U-shaped bracket such that when a side impact is received by the door the side impact beam does not contact the element U-shaped bracket.

12. A vehicle having a door according to claim 1 and a vehicle body that comprises a rocker, wherein the door is mounted in the vehicle body such that the element U-shaped bracket is at the height of the rocker.

13. The vehicle of claim 12, wherein the rocker comprises an inner shell and the outer shell defining a space between them, the inner and outer rocker shells being joined at least at a top flange, and the U-shaped bracket is arranged at least partially below the top flange.

\* \* \* \* \*